US012568933B2

(12) United States Patent
Zhu

(10) Patent No.: US 12,568,933 B2
(45) Date of Patent: Mar. 10, 2026

(54) NOISE-REDUCING PET CALMING VEST

(71) Applicant: Yudong Zhu, Suzhou (CN)

(72) Inventor: Yudong Zhu, Suzhou (CN)

( * ) Notice: Subject to any disclaimer, the term of this patent is extended or adjusted under 35 U.S.C. 154(b) by 0 days.

(21) Appl. No.: 19/262,119

(22) Filed: Jul. 8, 2025

(65) Prior Publication Data

US 2025/0331498 A1 Oct. 30, 2025

(51) Int. Cl.
*A01K 13/00* (2006.01)

(52) U.S. Cl.
CPC ................................. *A01K 13/006* (2013.01)

(58) Field of Classification Search
CPC ... A01K 13/006; A01K 13/008; A01K 27/002
See application file for complete search history.

(56) References Cited

U.S. PATENT DOCUMENTS

| | | | | | |
|---|---|---|---|---|---|
| 3,918,238 | A | * | 11/1975 | Lozzio | A01K 13/006 |
| | | | | | 54/79.2 |
| 9,374,983 | B1 | * | 6/2016 | Kuehr | A01K 13/006 |
| 10,874,087 | B2 | * | 12/2020 | Prazza | A01K 13/007 |
| 2010/0115895 | A1 | * | 5/2010 | Prill | A01K 13/006 |
| | | | | | 54/79.2 |

| | | | | | |
|---|---|---|---|---|---|
| 2013/0014705 | A1 | * | 1/2013 | Cho | A01K 27/006 |
| | | | | | 119/863 |
| 2014/0224189 | A1 | * | 8/2014 | Hamilton | A01K 13/006 |
| | | | | | 119/855 |
| 2016/0088818 | A1 | | 3/2016 | Thorne | |
| 2018/0055008 | A1 | * | 3/2018 | Yun | A01K 13/006 |
| 2018/0160651 | A1 | * | 6/2018 | Holt | A01K 27/008 |
| 2020/0330264 | A1 | * | 10/2020 | Hilton | A01K 13/006 |
| 2020/0352133 | A1 | * | 11/2020 | Blizzard | A01K 13/006 |
| 2021/0153458 | A1 | | 5/2021 | Pan | |
| 2023/0232785 | A1 | * | 7/2023 | Partipilo | A01K 11/00 |
| | | | | | 119/28.5 |
| 2023/0345910 | A1 | * | 11/2023 | Martensson | A01K 13/006 |
| 2024/0057561 | A1 | | 2/2024 | Chen | |

* cited by examiner

*Primary Examiner* — Trinh T Nguyen
(74) *Attorney, Agent, or Firm* — JEEN IP LAW, LLC

(57) ABSTRACT

A noise-reducing pet calming vest is provided, which relates to the technical field of pet calming. The noise-reducing pet calming vest includes a vest body made of elastic fabric, where the vest body includes a main body part configured to wrap a pet torso and a hood part configured to wrap a pet head, and a front end of the main body is connected to a rear end of the hood part; and a lower hood section configured to wrap a lower part of a pet face is formed on an inner side of the hood part, a top hood section configured to wrap a pet head top is formed on an outer side of the hood part, and noise-reducing sections configured to wrap pet ears are formed on both sides of the hood part.

9 Claims, 2 Drawing Sheets

NOISE-REDUCING PET CALMING VEST

TECHNICAL FIELD

The present disclosure relates to the technical field of pet calming, and in particular, to noise-reducing pet calming vest.

BACKGROUND

A pet calming vest applies a sustained, uniform, and slight stress to a pet body to simulate a holding feeling of a lactating mother holding a baby or a baby swaddle. This stress stimulation triggers a calming response in an autonomic nervous system, reduces adrenaline secretion level in a stress state, and simultaneously may promote release of hormones with sedative effects, such as oxytocin and endorphins, in a pet body, thereby achieving an effect of calming anxious emotions.

In a conventional technology, the pet calming vest mainly acts on a pet torso, and is difficult to provide targeted calming for a sensitive area, that is, a head, resulting in a poor effect. The head serves as an important gateway for a pet to receive external stimuli. In strong sound environments such as thunderstorms and firecrackers during the Spring Festival, it is difficult for puppies, due to underdeveloped nervous systems, and senior dogs, due to sensory degeneration and physical weakness, to dispel fears caused by direct stimulation to the head by only relying on calming of a torso part when facing these sudden noise impacts, resulting in significant reduction of a calming effect.

SUMMARY

An objective of the present disclosure is to provide a noise-reducing pet calming vest to solve a problem of poor calming effect of a pet calming vest in a conventional technology.

The present disclosure is implemented as follows: a noise-reducing pet calming vest includes a vest body made of elastic fabric, the vest body includes a main body part configured to wrap a pet torso and a hood part configured to wrap a pet head, and a front end of the main body is connected to a rear end of the hood part; and a lower hood section configured to wrap a lower part of a pet face is formed on an inner side of the hood part, a top hood section configured to wrap a pet head top is formed on an outer side of the hood part, and noise-reducing sections configured to wrap pet ears are formed on both sides of the hood part.

Further, a length of the top hood section is greater than that of the lower hood section.

Further, the main body part includes a back panel configured to wrap a pet back and an abdominal placket for fitting a pet abdomen, one side of the back panel is connected to one end of the abdominal placket, and the other end of the abdominal placket is connected to the back panel through a connecting structure to enclose and form a wearing space that fits a circumferential size of the pet torso.

Further, the connecting structure includes a hook tape arranged on the abdominal placket and loop strips fixed to the back panel, the loop strips are arranged in a manner of extending in a width direction of the back panel, and the two loop strips are vertically spaced away from each other on the back panel.

Further, one side of a central part of the back panel is connected to the abdominal placket, and the other side of the central part of the back panel protrudes and extends outward.

Further, the hook tape is arranged at an outer end of the abdominal placket.

Further, the top hood section, the lower hood section, and the noise-reducing section are integrally formed to enclose and form the hood part.

Further, the abdominal placket and the back panel are integrally formed.

Further, a front end of the hood part encloses and forms a front annular opening for the pet head to pass through, and a rear annular opening for the pet head to wear the hood part is formed in a front end of the back panel.

Further, an adjusting structure for adjusting a diameter of the front annular opening is arranged at the front end of the hood part.

Further, a thickened hood edging strip is arranged on an edge of the front end of the hood part, and the hood edging strip is arranged around a circumferential direction of the front annular opening.

Further, at least one main body edging strip is arranged on a peripheral edge of the main body part, and the main body edging strip is continuously arranged along a contour of the peripheral edge of the main body part.

Further, the main body part and the hood part are integrally formed.

Compared with a conventional technology, according to the noise-reducing pet calming vest provided in the present disclosure, a pet body is moderately wrapped by using elastic fabric, which can reduce destructive behaviors of a pet during anxiety, cannot excessively restrict normal activities, and balances comfort and functionality. Then, noise-reducing sections cover sensitive parts such as pet ears and wrap a head and a neck, which can more comprehensively simulate a wrapping feeling of a mother embrace, fills a gap in head calming, and effectively relieving anxious emotions of the pet caused by head exposure. In addition, stimuli of external sounds are reduced by physical isolation, and the anxious emotions of the pet are reduced.

DETAILED DESCRIPTION OF THE EMBODIMENTS

To make objectives, technical solutions, and advantages of the present disclosure clearer, the present disclosure will be further described in detail below with reference to accompanying drawings and embodiments. It is to be understood that specific embodiments described here are merely used to explain the present disclosure and are not intended to limit the present disclosure.

An implementation of the present disclosure is described in detail below with reference to a specific embodiment.

In the accompanying drawings of this embodiment, the same or same or similar reference signs correspond to the same or similar parts. In the description of the present disclosure, it is to be understood that orientations or positional relationships indicated by terms "upper", "lower", "left", "right", and the like are orientations or positional relationships shown based on the accompanying drawings, which are merely intended to facilitate describing the present disclosure and simplifying the description, rather than indicating or implying that indicated devices or elements have to have particular orientations, and constructed and operated in particular orientations. Therefore, the terms for describing the positional relationships in the accompanying drawings are merely used for example explanation, and cannot be understood as a limitation on the present disclosure. Those of ordinary skill in the art may understand specific meanings of the foregoing terms according to specific situations.

Figure 1:
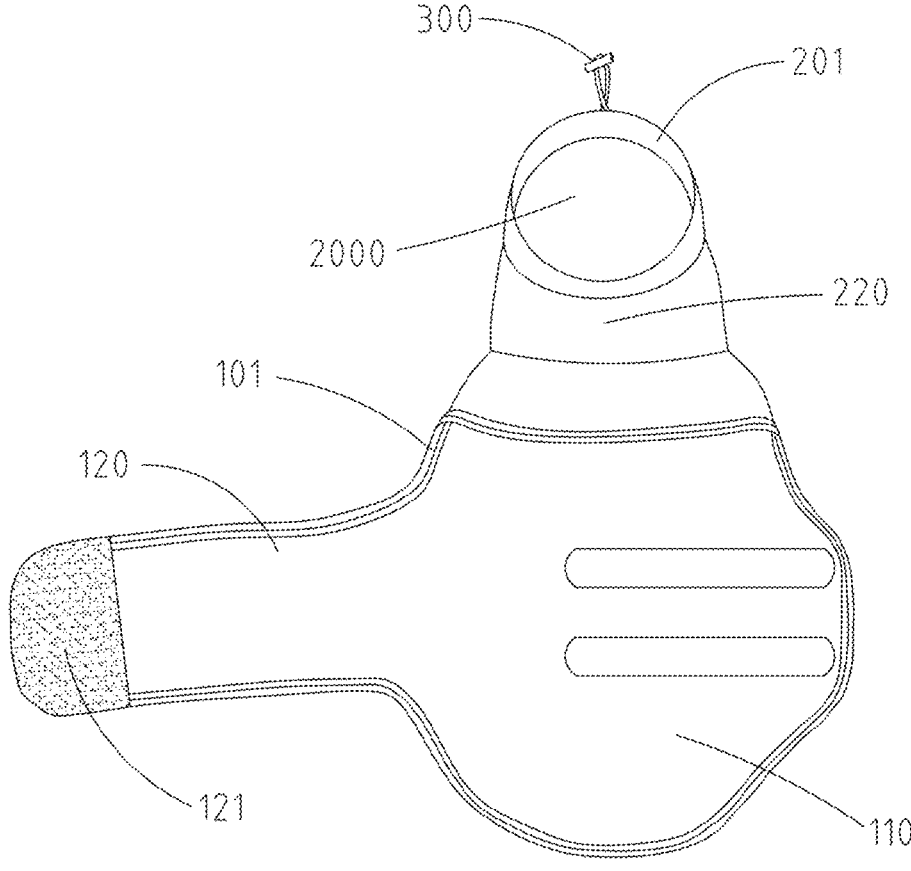
FIG. 1 is a top view of a spread noise-reducing pet calming vest according to the present disclosure.
Figure 2:
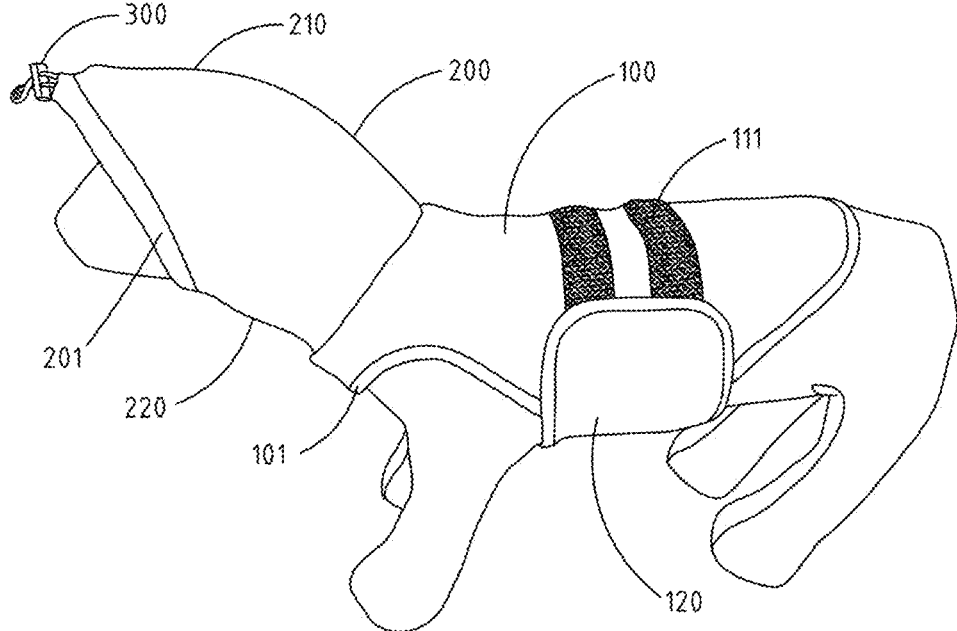
FIG. 2 is a schematic structural diagram of a noise-reducing pet calming vest according to the present disclosure applied to a pet model.

Refer to FIG. 1 and FIG. 2, which are preferred embodiments provided in the present disclosure.

The present disclosure provides a noise-reducing pet calming vest, including a vest body made of elastic fabric, the vest body includes a main body part 100 configured to wrap a pet torso and a hood part 200 configured to wrap a pet head, and a front end of the main body 100 is connected to a rear end of the hood part 200; and a lower hood section 220 configured to wrap a lower part of a pet face is formed on an inner side of the hood part 200, a top hood section 210 configured to wrap a pet head top is formed on an outer side of the hood part 200, and noise-reducing sections configured to wrap pet ears are formed on both sides of the hood part 200.

Compared with the noise-reducing pet calming vest provided by the present disclosure, a pet body is moderately wrapped by using elastic fabric, which can reduce destructive behaviors of a pet during anxiety, cannot excessively restrict normal activities, and balances comfort and functionality. Then, noise-reducing sections cover sensitive parts such as pet ears and wrap a head and a neck, which can more comprehensively simulate a wrapping feeling of a mother embrace, fills a gap in head calming, and effectively relieving anxious emotions of the pet caused by head exposure. In addition, stimuli of external sounds are reduced by physical isolation, and the anxious emotions of the pet are reduced.

A length of the top hood section 210 is greater than that of the lower hood section 220.

Because the length of the top hood section 210 is greater than that of the lower hood section 220, an effect that a neck collar has a lower front and a higher back is achieved. A rear collar is relatively high, so that ears and parts below the ears can be wrapped; and a front collar is relatively low, so that activity needs of the pet can be met to a greatest extent without destroying integrity.

Specifically, the elastic fabric may be 2.280 G healthy fabric, has elasticity, and is breathable, comfortable, and lightweight on a whole.

In this embodiment, the main body part 100 includes a back panel 110 configured to wrap a pet back and an abdominal placket 120 for fitting a pet abdomen, one side of the back panel 110 is connected to one end of the abdominal placket 120, and the other end of the abdominal placket 120 is connected to the back panel 110 through a connecting structure to enclose and form a wearing space that fits a circumferential size of the pet torso. In this way, a size of the wearing space is changed by adjusting the connecting structure to fit the pet torso.

Through a design that the main body part 100 includes the back panel 110 and the abdominal placket 120, after the wearing space is enclosed and formed, a front side of the abdominal placket 120 forms a front hollow area for forelegs of the pet to move, so that movement of the forelegs of the pet is not restricted; and a rear side of the abdominal placket 120 forms a rear hollow area for a rear body of the pet to move, so that movement of hind legs of the pet is not restricted, and excretion cannot be affected.

Specifically, the connecting structure includes a hook tape 121 arranged on the abdominal placket 120 and loop strips 111 fixed to the back panel 110, the loop strips 111 are arranged in a manner of extending in a width direction of the back panel 110, and the two loop strips 111 are vertically spaced away from each on the back panel. In this way, effects of adjusting and disassembling conveniently are achieved through connection between the hook tape 121 and the loop strips 111.

The hook tape 121 is a non-injection hook surface, and the loop strip 111 is a nylon looped surface, which can achieve an effect of binding repeatedly without reducing an adhesive force.

As a preferred embodiment, one side of a central part of the back panel 110 is connected to the abdominal placket 120, and the other side of the central part of the back panel 110 protrudes and extends outward. In this way, a position of the abdominal placket 120 fits a position of the pet abdomen, and the other side of the abdominal placket 120 extends outward, that is, extends towards the abdomen of the pet, so that larger area is covered, and pet mobility is not affected.

The hook tape 121 is at arranged at an outer end of the abdominal placket 120. In this way, after the hook tape 121 is fixed to the loop strip 111, two ends of the abdominal placket 120 are fixed, thereby achieving stable connection.

The top hood section 210, the lower hood section 220, and the noise-reducing section are integrally formed to and enclose and form the hood part. That is, an inner side of the hood part 200, an outer side of the hood part 200, and two sides of the hood part 200 are integrally formed. In this way, a seamless wrapping structure is formed in a manner of connecting from end to end, so that a better sense of safety is provided for the pet.

Specifically, the abdominal placket 120 and the back panel 110 are integrally formed. In this way, a structure is stable, and wearing is facilitated.

A front end of the hood part 200 encloses and forms a front annular opening 2000 for the pet head to pass through, and a rear annular opening for the pet head to wear the hood part 200 is formed in a front end of the back panel 110. In this way, pullover dressing is formed, the hood part 200 can be fixed simply and conveniently by only wearing the vest body on the pet head.

As a preferred embodiment, an adjusting structure 300 for adjusting a diameter of the front annular opening 2000 is arranged at the front end of hood part 200. In this way, overall fit of the vest is improved.

Specifically, the adjusting structure 300 may be an elastic drawstring. The elastic drawstring can be contracted by using a spring buckle, thereby achieving an effect of adjusting the front annular opening 2000 (a head circumference), and improving the overall fit of the in vest.

As a preferred embodiment, a thickened hood edging strip 201 is arranged on an edge of the front end of the hood part 200, and the hood edging strip 201 is around a circumferential direction of the front annular opening 2000. In this way, the thickened hood edging strip 201 arranged around can enhance strength of the edge of the front end of a hood, prevent wear and deformation, provide buffer protection, and improve sealing performance and appearance quality.

As a preferred embodiment, at least one main body edging strip 101 is arranged on a peripheral edge of the main body part 100, and the main body edging strip 101 is continuously arranged along a contour of the peripheral edge of the main body part 100. In this way, the main body edging strip 101 arranged continuously can strengthen a main body edge, avoid loosening and seam splitting, and optimizing appearance.

The main body part 100 and the hood part 200 are integrally formed. In this way, the vest body applies a uniform, sustained, and slight stress to various parts of the pet body to achieve an effect of calming anxious emotions. In addition, an overall structure is good, and wearing is facilitated.

What is claimed is:

1. A noise-reducing pet calming vest, comprising a vest body made of elastic fabric, wherein the vest body comprises a main body part snugly wrapped around a pet torso and a hood part snugly wrapped around a pet head to provide noise reduction and a calming effect for the pet, and a front end of the main body is connected to a rear end of the hood part; and a lower hood section wrapped a lower part of a pet face is formed on an inner side of the hood part, a top hood section wrapped a pet head top is formed on an outer side of the hood part, and noise-reducing sections snugly wrapped around pet ears are formed on both sides of the hood part;

wherein a length of the top hood section is greater than that of the lower hood section;

wherein the top hood section, the lower hood section, and the noise-reducing section are integrally formed to enclose and form the hood part;

wherein the main body part comprises a back panel wrapped a pet back and an abdominal placket for fitting a pet abdomen, wherein one side of the back panel is connected one end of the abdominal placket, and wherein another end of the abdominal placket is connected to the back panel through a connecting structure to enclose and form a wearing space that fits a circumferential size of the pet torso; wherein the connecting structure comprises a first bonding piece arranged on the abdominal placket and second bonding pieces fixed to the back panel, wherein the second bonding pieces are arranged in a manner of extending in a width direction of the back panel, and the second bonding pieces are vertically spaced away from each other on the back panel;

wherein a front end of the hood part encloses and forms a front annular opening for the pet head to pass through, and wherein a rear annular opening for the pet head to wear the hood part is formed in a front end of the back panel; wherein an adjusting structure configured for adjusting a diameter of the front annular opening is arranged at the front end of the hood part; wherein the adjusting structure is an elastic drawstring configured to be contracted by using a spring buckle;

wherein a thickened hood edging strip is arranged on an edge of the front end of the hood part, and the hood edging strip is arranged around a circumferential direction of the front annular opening.

2. The noise-reducing pet calming vest according to claim 1, wherein one side of a central part of the back panel is connected to the abdominal placket, and the other side of the central part of the back panel protrudes and extends outward.

3. The noise-reducing pet calming vest according to claim 1, wherein the first bonding piece is arranged at an outer end of the abdominal placket.

4. The noise-reducing pet calming vest according to claim 1, wherein the abdominal placket and the back panel are integrally formed.

5. The noise-reducing pet calming vest according to claim 1, wherein at least one main body edging strip is arranged on a peripheral edge of the main body part, and the main body edging strip is continuously arranged along a contour of the peripheral edge of the main body part.

6. The noise-reducing pet calming vest according to claim 1, wherein at least one main body edging strip is arranged on a peripheral edge of the main body part, and the main body edging strip is continuously arranged along a contour of the peripheral edge of the main body part.

7. The noise-reducing pet calming vest according to claim 1, wherein the main body part and the hood part are integrally formed.

8. The noise-reducing pet calming vest according to claim 1, wherein the first bonding piece is a hook tape comprising a non-injection hook surface, and wherein the second bonding portions are loop strips comprising a nylon looped surface.

9. The noise-reducing pet calming vest according to claim 1, wherein the elastic fabric is a 2.280 G healthy fabric.

* * * * *